United States Patent
Wang et al.

(10) Patent No.: US 11,739,009 B2
(45) Date of Patent: Aug. 29, 2023

(54) DEVICE FOR DECOMPLEXATION AND ENHANCED REMOVAL OF COPPER BASED ON SELF-INDUCED FENTON-LIKE REACTION CONSTRUCTED BY ELECTROCHEMISTRY COUPLED WITH MEMBRANE SEPARATION, AND USE THEREOF

(71) Applicants: Tongji University, Shanghai (CN); Tianjin Polytechnic University, Tianjin (CN)

(72) Inventors: Zhiwei Wang, Shanghai (CN); Hongwei Zhang, Tianjin (CN); Liang Wang, Tianjin (CN); Jiayi Li, Shanghai (CN); Xueye Wang, Shanghai (CN); Mei Chen, Shanghai (CN); Ruobin Dai, Shanghai (CN)

(73) Assignees: TONGJI UNIVERSITY, Shanghai (CN); TIANJIN POLYTECHNIC UNIVERSITY, Tianjin (CN)

( * ) Notice: Subject to any disclaimer, the term of this patent is extended or adjusted under 35 U.S.C. 154(b) by 348 days.

(21) Appl. No.: 16/934,054

(22) Filed: Jul. 21, 2020

(65) Prior Publication Data
US 2021/0198122 A1    Jul. 1, 2021

(30) Foreign Application Priority Data
Dec. 25, 2019 (CN) .......... 201911352012.X

(51) Int. Cl.
*B01D 61/14* (2006.01)
*B01D 69/02* (2006.01)
(Continued)

(52) U.S. Cl.
CPC .......... *C02F 1/4672* (2013.01); *B01D 61/147* (2013.01); *B01D 67/0013* (2013.01);
(Continued)

(58) Field of Classification Search
CPC .......... B01D 61/147; B01D 2311/2684; C02F 1/444; C02F 1/4672; C02F 2201/46115; C02F 2305/026
See application file for complete search history.

(56) References Cited

FOREIGN PATENT DOCUMENTS

| CN | 107162118 A | * | 9/2017 | ............. B01D 61/42 |
| CN | 108394960 A | * | 8/2018 | ............. C02F 1/444 |

OTHER PUBLICATIONS

Fu W—CN-108394960-A machine translation—Aug. 2018 (Year: 2018).*
Wang Q—CN-107162118-A machine translation—Sep. 2017 (Year: 2017).*

* cited by examiner

*Primary Examiner* — Bradley R Spies
(74) *Attorney, Agent, or Firm* — Bayramoglu Law Offices LLC

(57) ABSTRACT

A device for decomplexation and enhanced removal of copper based on self-induced Fenton-like reaction constructed by electrochemistry coupled with membrane separation is disclosed. The device includes a reactor, two electrocatalytic anodes capable of generating hydroxyl radicals, an electrocatalytic cathode membrane assembly, a direct current power supply, an aeration system, an inlet pipe and an outlet pipe. The device of the present invention has a simple construction. Using this device to treat industrial wastewater containing copper complexes under specific conditions allows the decomplexation and the removal of the industrial wastewater containing the copper complexes to be simultaneously realized at a low consumption and a high efficiency. The coupling of electrochemistry with membrane separation can be achieved to protect the cathode from being contaminated by pollutants in the sewage and prolong the service life of the electrode.

3 Claims, 1 Drawing Sheet

(51) Int. Cl.
*C02F 1/44* (2023.01)
*C02F 1/461* (2023.01)
*C02F 1/467* (2023.01)
*C02F 101/20* (2006.01)
*B01D 67/00* (2006.01)
*B01D 69/14* (2006.01)

(52) U.S. Cl.
CPC ........... *B01D 69/02* (2013.01); *B01D 69/141* (2013.01); *C02F 1/444* (2013.01); *C02F 1/46109* (2013.01); *B01D 2311/2684* (2013.01); *B01D 2313/26* (2013.01); *B01D 2313/345* (2013.01); *B01D 2325/02* (2013.01); *B01D 2325/26* (2013.01); *C02F 2001/46133* (2013.01); *C02F 2101/20* (2013.01); *C02F 2201/4619* (2013.01); *C02F 2201/46115* (2013.01); *C02F 2305/023* (2013.01); *C02F 2305/026* (2013.01)

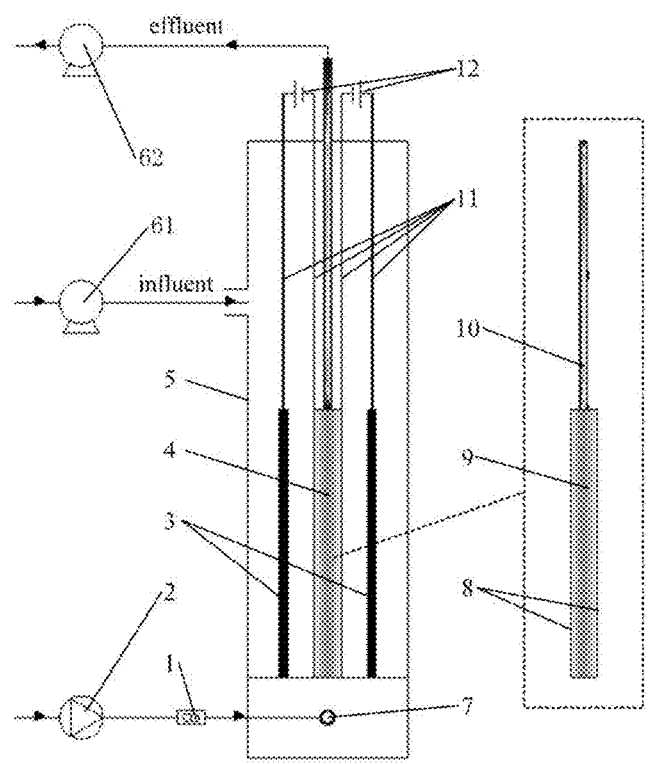

DEVICE FOR DECOMPLEXATION AND ENHANCED REMOVAL OF COPPER BASED ON SELF-INDUCED FENTON-LIKE REACTION CONSTRUCTED BY ELECTROCHEMISTRY COUPLED WITH MEMBRANE SEPARATION, AND USE THEREOF

CROSS REFERENCE TO THE RELATED APPLICATIONS

This application is based upon and claims priority to Chinese Patent Application No. 201911352012.X, filed on Dec. 25, 2019, the entire contents of which are incorporated herein by reference.

TECHNICAL FIELD

The present invention relates to wastewater treatment, and more specifically, to a device for decomplexation and enhanced removal of copper based on self-induced Fenton-like reaction constructed by electrochemistry coupled with membrane separation and use thereof.

BACKGROUND

Water pollution is becoming a severe concern in China, which seriously restricts the sustainable development of China's social economy. Industrial wastewater pollution is very harmful to the environment and humans. Once pollution enters a water body, it easily causes bioaccumulation with long lasting pollution. High-concentrated organic wastewater, heavy metal-polluted industrial wastewater and the like have complex aqueous compositions and are resistant to treatment. In addition, since most heavy metal ions have a high affinity to carboxyl or amino functional groups in organic complexing agents, stable complexes are readily formed when they coexist in the water body. These complexes tend to have a relatively low chemical reactivity and are difficult to precipitate, rendering most traditional sewage (wastewater) treatment methods ineffective, increasing treating difficulty.

Currently, industrial wastewater containing heavy metals and their complexes is usually treated by decomplexation and then removal/recovery. Specifically, the decomplexation is typically performed by advanced oxidation methods such as electrochemical oxidation, photocatalytic oxidation and ozone oxidation, and the removal/recovery of the heavy metals is realized by electroreduction or alkaline precipitation after the decomplexation. In the traditional electrochemical process, however, the oxidative decomplexation mainly depends on the anode, and the heavy metal reduction mainly depends on the cathode. Therefore, oxidative decomplexation and heavy metal reduction separately depend on two staged processes, which limits further improvement of the efficiency and performance of the process. In addition, the electrochemical process may result in increased cost in practice because the electrode contamination greatly reduces the service life of electrodes. Therefore, it is highly desirable in the field of industrial wastewater treatment to concurrently implement decomplexation and removal of heavy metal complexes from industrial wastewater and prolong the service life of electrodes.

SUMMARY

In view of the problems in the prior art, the present invention provides a device for decomplexation and enhanced removal of copper based on self-induced Fenton-like reaction constructed by electrochemistry coupled with membrane separation and use thereof. The device of the present invention has a simple construction. By using this device, not only can industrial wastewater containing copper complexes be subjected to the decomplexation and the removal simultaneously at a low consumption and a high efficiency, but also the coupling of electrochemistry with membrane separation can be achieved to protect the cathode from being contaminated by pollutants in the sewage, thereby prolonging the service life of the electrode.

In order to achieve the above technical objectives, the present invention provides the following technical solutions.

A device for decomplexation and enhanced removal of copper based on self-induced Fenton-like reaction constructed by electrochemistry coupled with membrane separation includes a reactor, two electrocatalytic anodes capable of generating hydroxyl radicals, an electrocatalytic cathode membrane assembly, a direct current power supply, an aeration system, an inlet pipe, and an outlet pipe. The electrocatalytic anodes and the electrocatalytic cathode membrane assembly are both located in the reactor, the electrocatalytic anodes are connected to a positive pole of the direct current power supply via a wire, and the electrocatalytic cathode membrane assembly is located between the two electrocatalytic anodes. The electrocatalytic cathode membrane assembly includes a membrane bracket, a composite conductive microfiltration membrane and an outlet pipe of membrane assembly. The composite conductive microfiltration membrane is attached on both sides of the membrane bracket, and the composite conductive microfiltration membrane is connected to a negative pole of the direct current power supply via a wire. The membrane bracket has an inner cavity in communication with the outlet pipe of membrane assembly through a suction port provided on the membrane bracket. The aeration system includes an aeration tube, a flow meter and an air pump, the aeration tube is located below the electrocatalytic cathode membrane assembly, and the flow meter is configured to regulate the flow rate of intake air. The inlet pipe is in communication with a water inlet provided in an upper portion of the reactor, and a water inlet pump is provided on the inlet pipe. The outlet pipe is in communication with a water outlet of the outlet pipe of membrane assembly, and a water outlet pump is provided on the outlet pipe.

Preferably, the electrocatalytic anode is any one selected from the group consisting of a graphite plate, an activated carbon fiber felt and a metal oxide active electrode.

Preferably, the composite conductive microfiltration membrane is prepared as follows. A titanium wire mesh is placed on a non-woven fabric, followed by knife coating a casting solution on the titanium wire mesh for phase inversion to obtain the composite conductive microfiltration membrane embedded with the titanium wire mesh. The membrane pore size is 0.1-0.4 μm.

The above-mentioned device is used in the treatment of industrial wastewater containing copper complexes, wherein the industrial wastewater contains copper ions with a concentration of 1-32 mg/L, and the copper complexes with a concentration of 0-0.5 mM at a pH of 3-7, the use includes the following steps:

(1) allowing the industrial wastewater to enter the reactor through the inlet pipe and the water inlet under the action of the water inlet pump;

(2) turning on the air pump, and adjusting the flow meter to aerate air into the reactor through the aeration tube;

(3) switching on the direct current power supply for an electrolysis at a voltage controlled to 1.5-4 V for a time period of 1.5-2.5 hours; and (4) turning on the water outlet pump to withdraw the industrial wastewater in the reactor through the membrane assembly.

Preferably, in step (2), the aeration tube has an aeration flow rate of 0.3 L/min.

The method of the present invention has the following principles.

Hydroxyl radicals with strong oxidizing activity are generated by the anode under the action of electrocatalysis, and participate in the following decomplexation reaction:

$$[L_i\text{-}Cu^{II}] \text{ (stable copper complex)} + \cdot OH \rightarrow [L_a\text{-}Cu^{II}] \text{ (active copper complex)} + OH^-$$

$O_2$ dissolved in water gains electrons on the surface of the composite conductive microfiltration membrane and is thus reduced to generate $H_2O_2$. Under the suction and separation of the membrane assembly, the following Fenton-like reaction occurs between the active copper complex and hydrogen peroxide near the cathode, generating more substances with strong oxidizing activity (such as hydroxyl radical):

$$[L_a\text{-}Cu^{II}] + H_2O_2 \rightarrow [L_a\text{-}Cu^{I}] + O_2^{-} + 2H^+$$

$$[L_a\text{-}Cu^{I}] + H_2O_2 \rightarrow [L_a\text{-}Cu^{II}] + \cdot OH + OH^-$$

As more oxidizing substances are generated, more active copper complexes will be generated, some of which will participate in the Fenton-like reaction, and some will undergo the following direct reduction reaction or precipitation reaction due to changes in the pH near the electrode:

$$[L_a\text{-}Cu^{II}] + 2e^- \rightarrow L_a + Cu^0 \downarrow$$

$$[L_a\text{-}Cu^{II}] + 2OH^- \rightarrow L_a + [Cu^{II}(OH)_2] \downarrow$$

thereby simultaneously achieving the decomplexation and the enhanced removal of the industrial wastewater containing copper complexes.

The above description shows that the present invention has the following advantages:

(1) Achieving the decomplexation of copper and the recovery of copper in a chain manner.

The use of the composite conductive microfiltration membrane enables the coupling of electrochemistry with membrane separation, ensuring that the electrochemical oxidation process and the electrochemical reduction process occur in a chain manner, thereby achieving the integration of decomplexation of copper with recovery of copper. Compared with decomplexation and recovery in a stepwise manner, the decomplexation rate and the energy consumption can be further balanced.

(2) Ingeniously making use of the characteristics of the water quality to improve energy efficiency of the system.

In the present invention, the substances with high oxidizing activity generated due to the Fenton-like reactivity of certain copper complexes in the wastewater are used to achieve self-decomplexation, which greatly reduces the dependence on the electrochemical oxidation process and the anode material. Therefore, using simple anode materials can achieve good effects, which can reduce process costs.

(3) Achieving the coupling of membrane separation and electrochemistry

In the present invention, a successful coupling of electrochemistry and membrane separation is achieved. For the electrode, membrane separation can protect the electrode from being contaminated by particulate matters and colloidal substances in the sewage, thereby prolonging the service life of the electrode. In addition, the membrane separation process will enhance the mass transfer effect near the electrode, thereby improving the electrochemical efficiency. At the same time, the coupled electrochemistry can reduce the membrane contamination to a certain extent and improve the operating efficiency and performance of the membrane.

BRIEF DESCRIPTION OF THE DRAWINGS

FIGURE shows a schematic structural diagram of the reaction device of the present invention.

REFERENCE NUMERALS

1. flow meter; 2. air pump; 3. electrocatalytic anode; 4. electrocatalytic cathode membrane assembly; 5. reactor; 61. water inlet pump; 62. water outlet pump; 7. aeration tube; 8. composite conductive microfiltration membrane; 9. membrane bracket; 10. outlet pipe of membrane assembly; 11. wire; and 12. direct current power supply.

DETAILED DESCRIPTION OF THE EMBODIMENTS

The features of the present invention are further described below with reference to examples, which do not limit the claims of the present invention in any way.

EXAMPLE 1

As shown in the FIGURE, a device for decomplexation and enhanced removal of copper based on a self-induced Fenton-like reaction constructed by electrochemistry coupled with membrane separation includes the reactor 5, two electrocatalytic anodes 3, the electrocatalytic cathode membrane assembly 4, the direct current power supply 12, an aeration system, an inlet pipe and an outlet pipe. The electrocatalytic anodes 3 and the electrocatalytic cathode membrane assembly 4 are both located in the reactor 6, the electrocatalytic anodes 3 are graphite plates (size: 7 cm×10 cm), the electrocatalytic anodes 3 are connected to a positive pole of the direct current power supply 12 via the wire 11, and the electrocatalytic cathode membrane assembly 4 is located between the two electrocatalytic anodes 3. The electrocatalytic cathode membrane assembly 4 includes the membrane bracket 9, the composite conductive microfiltration membrane 8 and the outlet pipe 10 of membrane assembly. The composite conductive microfiltration membrane 8 (size: 7 cm×10 cm; pore size: 0.14 µm) is attached on both sides of the membrane bracket 9, and the composite conductive microfiltration membrane 8 is connected to a negative pole of the direct current power supply 12 via the wire 11. The composite conductive microfiltration membrane 8 is a titanium wire mesh embedded composite conductive microfiltration membrane prepared by first placing the titanium wire mesh on a non-woven fabric, and then knife coating a casting solution on the titanium wire mesh for phase inversion. The membrane bracket 9 has an inner cavity in communication with the outlet pipe 10 of membrane assembly through a suction port provided on the membrane bracket 9. The aeration system includes the aeration tube 7, the flow meter 1 and the air pump 2, the aeration tube 7 is located below the electrocatalytic cathode membrane assembly 4, and the flow meter 1 is configured to regulate the flow rate of intake air. The inlet pipe is in communication with a water inlet provided in an upper portion of the reactor, and the water inlet pump 61 is provided on the inlet pipe. The outlet pipe is in communication with a water outlet of the outlet pipe 10 of membrane assembly, and the water outlet pump 62 is provided on the outlet pipe.

The above-mentioned device is used to treat industrial wastewater containing copper complexes by a method including the following steps.

(1) The industrial wastewater containing the copper complexes is allowed to enter the reactor through the inlet pipe and the water inlet under the action of the water inlet pump, wherein the reactor has an effective volume of 714 mL and a hydraulic retention time of 2.5 hours.

(2) The air pump is turned on, and the flow meter is adjusted to aerate air into the reactor through the aeration tube, wherein the aeration tube has an aeration flow rate of 0.3 L/min.

(3) The direct current power supply is switched on for an electrolysis at a voltage controlled to 3 V for a time period of 2.5 hours.

(4) The water outlet pump is turned on to withdraw the industrial wastewater in the reactor through the membrane assembly.

After the industrial wastewater containing the copper complexes (the wastewater contains copper ions with a concentration of 32 mg/L and the copper complexes with a concentration of 0.5 mM at a pH of 4) is treated by the above-mentioned method, the decomplexation rate of the copper complexes in the wastewater is 84% and the removal rate of the copper ions is 76%.

EXAMPLE 2

The same device for decomplexation and enhanced removal of copper as in Example 1 is used to treat industrial wastewater containing copper complexes by a method including the following steps.

(1) The industrial wastewater containing the copper complexes is allowed to enter the reactor through the inlet pipe and the water inlet under the action of the water inlet pump, wherein the reactor has an effective volume of 714 mL and a hydraulic retention time of 2.5 hours.

(2) The air pump is turned on, and the flow meter is adjusted to aerate air into the reactor through the aeration tube, wherein the aeration tube has an aeration flow rate of 0.3 L/min.

(3) The direct current power supply is switched on for an electrolysis at a voltage controlled to 3.5 V for a time period of 2.5 hours.

(4) The water outlet pump is turned on to withdraw the industrial wastewater in the reactor through the membrane assembly.

After the industrial wastewater containing the copper complexes (the wastewater contains copper ions with a concentration of 32 mg/L and the copper complexes with a concentration of 0.5 mM at a pH of 4) is treated by the above-mentioned method, the decomplexation rate of the copper complexes in the wastewater is 84% and the removal rate of the copper ions is 76%.

EXAMPLE 3

The same device for decomplexation and enhanced removal of copper as in Example 1 is used to treat industrial wastewater containing copper complexes by a method including the following steps.

(1) The industrial wastewater containing the copper complexes is allowed to enter the reactor through the inlet pipe and the water inlet under the action of the water inlet pump, wherein the reactor has an effective volume of 714 mL and a hydraulic retention time of 2.5 hours.

(2) The air pump is turned on, and the flow meter is adjusted to aerate air into the reactor through the aeration tube, wherein the aeration tube has an aeration flow rate of 0.3 L/min.

(3) The direct current power supply is switched on for an electrolysis at a voltage controlled to 4 V for a time period of 2.5 hours.

(4) The water outlet pump is turned on to withdraw the industrial wastewater in the reactor through the membrane assembly.

After the industrial wastewater containing the copper complexes (the wastewater contains copper ions with a concentration of 32 mg/L and the copper complexes with a concentration of 0.5 mM at a pH of 4) is treated by the above-mentioned method, the decomplexation rate of the copper complexes in the wastewater is 84% and the removal rate of the copper ions is 81%.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes or devices, and any further applications of the principles of the invention as described herein, are contemplated as would normally occur to one skilled in the art to which the invention pertains.

What is claimed is:

1. A device for decomplexation and enhanced removal of copper based on a self-induced Fenton-like reaction constructed by electrochemistry coupled with membrane separation, comprising a reactor, two electrocatalytic anodes, an electrocatalytic cathode membrane assembly, a direct current power supply, an aeration system, an inlet pipe, and a first outlet pipe; wherein the two electrocatalytic anodes generate hydroxyl radicals, wherein each of the two electrocatalytic anodes is one selected from the group consisting of an activated carbon fiber felt and a metal oxide active electrode, the two electrocatalytic anodes and the electrocatalytic cathode membrane assembly are both located in the reactor, the two electrocatalytic anodes are connected to a positive pole of the direct current power supply via a first wire, and the electrocatalytic cathode membrane assembly is located between the two electrocatalytic anodes, wherein the electrocatalytic cathode membrane assembly comprises a membrane bracket, a composite conductive microfiltration membrane and a second outlet pipe, wherein the composite conductive microfiltration membrane is prepared by placing a titanium wire mesh on a non-woven fabric, and knife coating a casting solution on the titanium wire mesh for a phase inversion, the composite conductive microfiltration membrane is embedded with the titanium wire mesh, and the composite conductive microfiltration membrane has a membrane pore size of 0.1-0.4 μm, the composite conductive microfiltration membrane is attached on both sides of the membrane bracket, the composite conductive microfiltration membrane is connected to a negative pole of the direct current power supply via a second wire, and the membrane bracket has an inner cavity in communication with the second outlet pipe through a suction port provided on the membrane bracket, wherein the aeration system comprises an aeration tube, a flow meter, and an air pump, the aeration tube is located below the electrocatalytic cathode membrane assembly, and the flow meter is configured to regulate a flow rate of intake air, wherein the inlet pipe is in communication with a water inlet provided in an upper portion of the reactor, and a water inlet pump is provided on the inlet pipe, and wherein the first outlet pipe is in communication with a water outlet of the second outlet pipe, and a water outlet pump is provided on the first outlet pipe.

2. A method of using the device according to claim 1 in a treatment of industrial wastewater containing copper complexes, wherein the industrial wastewater contains copper ions with a concentration of 1-32 mg/L and the copper complexes with a concentration of 0-0.5 mM at a pH of 3-7, and the method comprises the following steps:

(1) allowing the industrial wastewater to enter the reactor through the inlet pipe and the water inlet under an action of the water inlet pump;

(2) turning on the air pump, and adjusting the flow meter to aerate air into the reactor through the aeration tube;

(3) switching on the direct current power supply for an electrolysis at a voltage controlled to 1.5-4 V for a time period of 1.5-2.5 hours; and (4) turning on the water outlet pump to withdraw the industrial wastewater in the reactor through the electrocatalytic cathode membrane assembly.

3. The method according to claim 2, wherein in step (2), the aeration tube has an aeration flow rate of 0.3 L/min.

* * * * *